March 2, 1965 W. J. BENCKERT 3,171,295
AIR-LUBRICATED SCREW AND NUT
Filed June 5, 1962
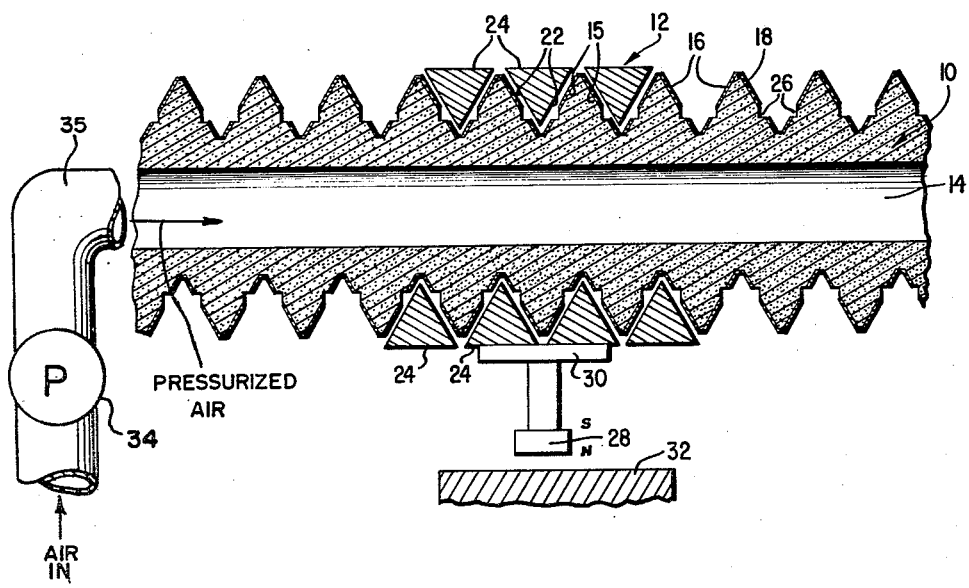
INVENTOR.
WILLIS J. BENCKERT
BY
ATTORNEYS.

United States Patent Office 3,171,295
Patented Mar. 2, 1965

3,171,295
AIR-LUBRICATED SCREW AND NUT
Willis J. Benckert, Glen Burnie, Md., assignor to Martin-Marietta Corporation, Baltimore, Md., a corporation of Maryland
Filed June 5, 1962, Ser. No. 200,188
8 Claims. (Cl. 74—424.8)

This invention relates to a linear-to-rotary movement transducer of the screw and nut type, and more particularly to such a transducer which is characterized by the apparent absence of frictional drag.

The means employed in the present invention for eliminating the frictional drag normally associated with devices of this nature is not intended to be limited to transducers but has application universally to the bearing field.

It has long been known that the pressurized movement of a low viscosity fluid in the form of a gas such as air will support one solid object with respect to the other and this principle forms the basis of the air bearing field. If the fluid flow, in terms of volume and pressure, is sufficient to overcome the forces tending to hold the solid objects together, the two objects will actually be prevented from physically contacting each other with one of the objects supported on a fluid cushion. If the objects are in relative motion, the restraint by one of the solid objects against movement of the other is practically zero, of course, depending upon the viscosity of the fluid. Since air and other gases have extremely low viscosity, the frictional resistance or restraint is so small that in most cases it is negligible.

In the measurement of relatively small forces, it is sometimes advantageous to measure them in terms of movement. In some cases, it is necessary to change extremely small movements from one type of motion to another, such as the change of a linear movement to a rotary movement or vice versa. One conventional method of changing linear movement to rotary movement makes use of a pair of threaded members such as a longitudinally extending screw and a rotatable nut. In the past, however, the screw and nut method of changing motion has been impractical, especially in the case of extremely small forces, since relatively large frictional restraining forces are set up between the threaded screw and the threaded nut.

It is, therefore, the primary object of this invention to provide an improved linear-to-rotary movement transducer of the type employing an axially extending screw and a rotatable nut threadedly mounted thereon which is characterized by the apparent absence of friction between these two members.

It is a further object of this invention to provide an improved transducer of this type in which means are provided for supporting the nut on the screw by means of a low viscosity fluid.

Certain metals which seem to be essentially solid have been found to be rather porous in nature and will actually allow low viscosity fluids to penetrate therethrough, especially if the fluid is pressurized. In fact, some conventional air bearings make use of metals of this type for delivering a layer of pressurized air to support one solid object in spaced relation to another. However, since the porosity of the metal is not uniform, in the past, close control of the flow of the low viscosity fluid has been relatively unattainable.

It is, therefore, another object of this invention to provide an improved air bearing in which pressurized low viscosity fluid is delivered to the working surface through a porous metal body in which the movement of fluid through the porous body is precisely controlled.

It is a further object of this invention to provide an improved low friction, linear-to-rotary movement transducer, of the type employing an axially extending screw and a rotatable nut threadedly mounted thereon in which one of the members is formed of a porous material, allowing a low viscosity fluid to flow through this material whereby the nut is physically spaced from the screw by the moving fluid.

It is a further object of this invention to provide an improved transducer of this type in which the flow of low viscosity fluid is closely controlled to effect a uniform distribution over the surface of the concentric members.

Further objects of this invention will be pointed out in the following detailed description of the claims and illustrated in the accompanying drawing, which discloses, by way of example, the principle of this invention and the best mode which has been contemplated of applying that principle.

In the drawing:

The single figure is a side elevational view, partially in section, of one form of the present invention.

In general, the apparatus of this invention in one form, comprises a linear-to-rotary movement transducer of the type employing a longitudinally extending screw with a nut threadedly mounted on the screw for rotation thereto. The screw is formed of a porous material such as porous sintered metal and includes a central bore extending longitudinally thereof. The faces of the screw threads are provided with a non-porous coating. A low viscosity fluid such as air is supplied under pressure to the central bore but is prevented from passing through the porous material by the coating except at spaced points within the thread faces where slots are provided for directing pressurized low viscosity fluid against the thread faces of the nut. The pressurized fluid acts to physically space the nut from the screw. In a preferred embodiment, the nut is in the form of a wire helix allowing a low viscosity gas to flow radially therefrom to prevent the gas from moving the nut axially of the screw. Magnetic means are employed for restraining rotation of the nut with respect to the screw but allowing axial movement thereof.

Referring to the drawing, there is shown the two principal components of the low friction linear-to-rotary movement transducer comprising a longitudinally extending screw 10 formed of a highly porous material such as metal and a solid nut 12 which may also be formed of metal coaxially positioned on the screw. The screw 10 includes a central bore 14 which acts as a fluid passageway for delivering low viscosity fluid, such as air under pressure from a pump 34 connected to the central bore by a tube 35, to the center of the screw. Since the screw 10 is formed of porous material, the air under pressure within bore 14 will tend to seep radially through the screw and escape radially from the outer surface of screw 10 in a more or less uniform manner depending upon the relative porosity of the different areas of the screw. The escape of fluid other than at the thread faces is prevented. It is desirable to have a uniform and controlled escape of air due to the fact that the linear transducer is being used to change a resultant linear movement in response to extremely small forces into rotary movement, and vice versa, and it is important that the elements making up the transducer are not affected by any extraneous forces set up by the movement of the low viscosity fluid. In order to control the flow of low viscosity fluid, the outer surface 15 of the screw is covered with a coating 18 which may be of any material acting to seal the porous outer surface forming thread faces 16.

In the particular form shown, the nut 12 is actually formed from a wire as indicated in the drawing in cross section, the individual turns being triangular in cross section. Each turn, therefore, has a pair of joined, complementary thread faces 22 and an outer surface 24. This allows the escape of fluid from between the turns in an advantageous manner to prevent any lateral movement or rotary movement of the nut with respect to the screw as a result of unequal fluid flow.

In a preferred form, there is formed on each thread face 16 within coating 18, a slot 26 which extends through the coating to the outer surface 15 of the porous screw 10, allowing the pressurized air to flow out of the porous screw 10 against opposed thread faces 22 of the nut 12 in a regulated manner. It has been determined that the position of the slot 26 for best results is from one-third to one-half way from the bottom land of the screw thread. The cross-sectional area of the slot for the right and left-hand faces should be equal so that there is no net force acting on the faces 22 of the nut tending to move it in either direction.

With the air supply connected to bore 14, fluid issuing from the slot 26 causes the nut 12 to physically move away from screw 10 such that the nut is not in actual contact with the screw at any point. Therefore, any axial force on the nut will tend to spin it with respect to the screw, since the only restraint against such movement is the viscous drag opposed by the fluid and this is very small due to the low viscosity of the fluid such as air. Means are provided for restraining the tendency to spin, the means preferably taking the form of a permanent magnet 28 which is rigidly coupled to one or more of the turns of the nut 12 by support means 30, attached to the outer face 24 of the nut. The permanent magnet 28 is positioned adjacent a metal bar 32 but spaced therefrom, the metal bar being formed of iron or ferrite. Thus, the magnetic attraction between the permanent magnet 28 and the bar 32 acts to restrain rotary movement of the nut with respect to the bar but allows axial movement thereto. The bar 32 is fixed.

In one form, the transducer operates in the following manner. If an axial force is exerted on the nut 12, through the conventional inclined plane effect, there will be a tendency for the screw 10 to revolve with respect to the longitudinally moving nut. Since the only frictional resistance to such movement is that of the air bearing, any small forces exerted on the screw tending to move it axially will result in a rotation of the screw 10 with very little dampening.

Inherently, the provision of slots within the thread faces 16 of screw 10 act to center the individual turns of the nut with respect to the threads of the screw. For instance, if the nut 12 tends to move axially, of course it will rotate the screw 10. At the same time, there is a tendency for one of the faces 22 in the direction of movement of the nut to move relatively close to one of the faces 16 of the nut, while the other two respective faces 16 and 22 of the screw and nut move away from each other. However, this movement will tend to increase the pressure exerted on one face 16 of the nut while reducing the pressure on the opposite face of the same thread. The increased pressure on the one face will, therefore, tend to return the individual thread of the nut to a centered position with equal forces being exerted by the fluid flowing out of the slot 26 against faces 22.

It is important to note that in the preferred embodiment, the nut member 12 is formed of a wire and therefore has gaps between each one of the threads or turns allowing the high pressure fluid which is escaping from slot 26 to move up along the faces 22 of each of the turns of the nut 12 and escape radially outward away from the nut in a line which is generally perpendicular to the axis of the screw. This promotes axial stability of the nut with respect to the screw.

The use of a porous metal in the formation of one member of the transducer with respect to the other, such as the screw in the embodiment shown in the drawing, is only illustrative of one desirable arrangement with the present invention being applicable to a great variety of air bearing problems. One of the features which allows the use of a porous material for directing a pressurized fluid at the points required is the means provided for restricting the general flow of fluid through the porous member. The means for sealing the threaded surface 15 may take the form of a coating which is applied by metal plating or other means, or the thread surface may be sealed by grinding or other mechanical abrasion means for eliminating the porosity of the outer surface. In fact, rather than completely sealing the outer surface and then creating spaced slots of equal area, such as those indicated at 26 in the drawing, a technique in which the surface is merely "inhibited" rather than sealed completely by permitting a small portion of the pores to remain open would produce equal results to the more complicated process described fully above. However, the technique of completely sealing the outer surface of the porous member and the formation of openings or slots at predetermined, exact areas on the outer surface of the porous member for subsequently directing pressurized fluid flow at specific areas of an element supported thereby has application, in addition to the air bearing screw and nut transducer to an exceedingly wide range of devices within the conventional rotary and non-rotary fluid bearing art. The openings in the porous member will take the place of the usual channels and orifices which are quite costly to produce in solid metal blocks by the use of conventional drilling techniques.

It is also apparent that in its preferred application the use of the present technique permits the direct conversion of axial or linear effort to rotation effort and vice versa with unbelievably small friction loss.

While there has been shown and described and pointed out the fundamental novel features of the invention as applied to a preferred embodiment, it will be understood that various omissions and substitutions and changes in the form and detail of the device illustrated and in its operation may be made by those skilled in the art without departing from the spirit of the invention. It is the intention, therefore, to be limited only as indicated by the scope of the following claims.

What is claimed is:

1. A low friction, linear-to-rotary movement transducer comprising: a longitudinally extending screw formed of a porous material and having a throughbore therein, a nut threadedly mounted on said screw for rotation thereto, means for delivering pressurized, low viscosity fluid to said throughbore whereby said fluid passes radially through the pores of said porous screw against the threads of said nut for causing said nut to be physically spaced from said screw by said moving fluid.

2. Apparatus as claimed in claim 1 wherein the outer surface of said screw member is sealed to prevent passage of said pressurized low viscosity fluid from said porous screw, said sealed outer surface having slots of equal cross-sectional area formed within respective faces of said screw threads through which equal volumes of pressurized fluid are directed against the threads of said nut to physically space said nut from said screw.

3. Apparatus as claimed in claim 2 wherein said slots are formed on the faces of said screw thread from one-third to one-half the distance between the bottom and top lands of said screw threads.

4. The transducer of claim 2 including additionally means for restraining rotation of said nut.

5. A transducer as claimed in claim 1 wherein said nut is in the form of a helix having a radial air gap whereby the low viscosity fluid passes through said air gap at right angles to the axis of said screw for axially stabilizing said nut with respect to said screw.

6. The transducer of claim 5 including additionally a stationary metal bar spaced from said nut and a permanent magnet mounted on said nut and co-acting with said metal bar to restrain rotation of said nut.

7. An improved air bearing including a cylindrical supporting element formed of porous material and having an outer supporting sealed surface and a cylindrical bore passing therethrough, a cylindrical supported element axially aligned with said supporting element and radially spaced from said supporting surface, means for passing a pressurized low viscous fluid into said cylindrical bore and the pores of said porous material against said sealed supporting surface, said sealed surface having at least one slot formed therein through which said fluid can pass to act against said supported element whereby said supporting and said supported elements are physically spaced from one another.

8. A low friction, linear-to-rotary movement transducer comprising a longitudinally extending screw formed of porous material and having a central bore and a threaded exterior surface, means for sealing said outer threaded surface, a helical wire nut having complementary threads mounted on said screw for rotation thereto, means for connecting said throughbore to pressurize low viscosity fluid and means forming openings of equal cross-sectional area within respective thread faces of said screw whereby said pressurized low viscosity fluid passing through the pores of said porous material and between said threaded members acts to physically space said nut from said screw with said fluid passing radially outward between the turns of said wire screw to axially stabilize said nut with respect to said porous screw member.

References Cited by the Examiner
UNITED STATES PATENTS 2,320,353   6/43   Ernst et al. _____ 74—467
2,855,249   10/58  Gerard.

DON A. WAITE, *Primary Examiner.*